(12) United States Patent
Russell et al.

(10) Patent No.: US 11,474,055 B2
(45) Date of Patent: Oct. 18, 2022

(54) HIGH SAMPLE THROUGHPUT DIFFERENTIAL SCANNING CALORIMETER

(71) Applicant: Waters Technologies Corporation, Milford, MA (US)

(72) Inventors: Donald J. Russell, Orem, UT (US); David Serrell, Draper, UT (US); Anthony E. Arnerich, Fort Collins, CO (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 404 days.

(21) Appl. No.: 16/598,088

(22) Filed: Oct. 10, 2019

(65) Prior Publication Data
US 2020/0124548 A1    Apr. 23, 2020

Related U.S. Application Data

(60) Provisional application No. 62/748,682, filed on Oct. 22, 2018.

(51) Int. Cl.
| | |
|---|---|
| *G01N 25/02* | (2006.01) |
| *G01K 7/00* | (2006.01) |
| *G01K 17/00* | (2006.01) |

(52) U.S. Cl.
CPC .............. *G01N 25/02* (2013.01); *G01K 7/00* (2013.01); *G01K 17/00* (2013.01)

(58) Field of Classification Search
USPC .............. 374/12, 208, 31, 166, 112; 422/51
See application file for complete search history.

(56) References Cited

U.S. PATENT DOCUMENTS

| | | | |
|---|---|---|---|
| 8,696,989 B2* | 4/2014 | Esfandyarpour | .. G01N 25/4806 374/10 |
| 2005/0169344 A1* | 8/2005 | Hutter | .................. G01N 25/482 374/E7.004 |

(Continued)

FOREIGN PATENT DOCUMENTS

| | | | | |
|---|---|---|---|---|
| EP | 0051266 A2 * | 5/1982 | | |
| EP | 2821773 A1 * | 1/2015 | ............. | B01L 3/545 |

OTHER PUBLICATIONS

International Preliminary Report on Patentability in PCT/US2019/055532 dated May 6, 2021.

(Continued)

*Primary Examiner* — Mirellys Jagan
(74) *Attorney, Agent, or Firm* — Schmeiser, Olsen & Watts LLP

(57) ABSTRACT

Described is a differential scanning calorimeter (DSC) instrument capable of performing analyses of multiple samples at the same time. Some embodiments of DSC instruments described herein include a thermal substrate that provides a substantially uniform temperature across a surface of the substrate. A plurality of DSC units is in thermal communication with the substrate, for example, by mounting the units directly to the surface of the substrate. Each DSC unit includes a second thermal substrate for further thermal isolation, and a reference platform and sample platform to receive a reference cell and a sample cell, respectively. A thermoelectric device is disposed between each platform and the second thermal substrate. Optionally, the reference and sample cells may be disposable chips that can be discarded after measurement are performed, thereby reducing or eliminating the need to clean instrument components to prevent cross-contamination for subsequent instrument operation.

21 Claims, 12 Drawing Sheets

(56) References Cited

U.S. PATENT DOCUMENTS

| | | | |
|---|---|---|---|
| 2008/0071494 A1* | 3/2008 | Reading ................ | G01N 25/48 |
| | | | 374/E19.001 |
| 2017/0227480 A1 | 8/2017 | Russell et al. | |
| 2020/0064209 A1* | 2/2020 | Danley ................ | G01K 17/04 |

OTHER PUBLICATIONS

Invitation to Pay Additional Fees in PCT/US2019/055532 dated Mar. 17, 2020; 15 pages.
Wang, et al. "Demonstration of MEME-based differential scanning calorimetry for determining thermodynamic properties of biomolecules," Sep. 25, 2008, Sensors and Actuators B: Chemical, vol. 134, No. 2, pp. 953-958.
International Search Report and Written Opinion in PCT/US2019/055532 dated Jun. 23, 2020.

* cited by examiner

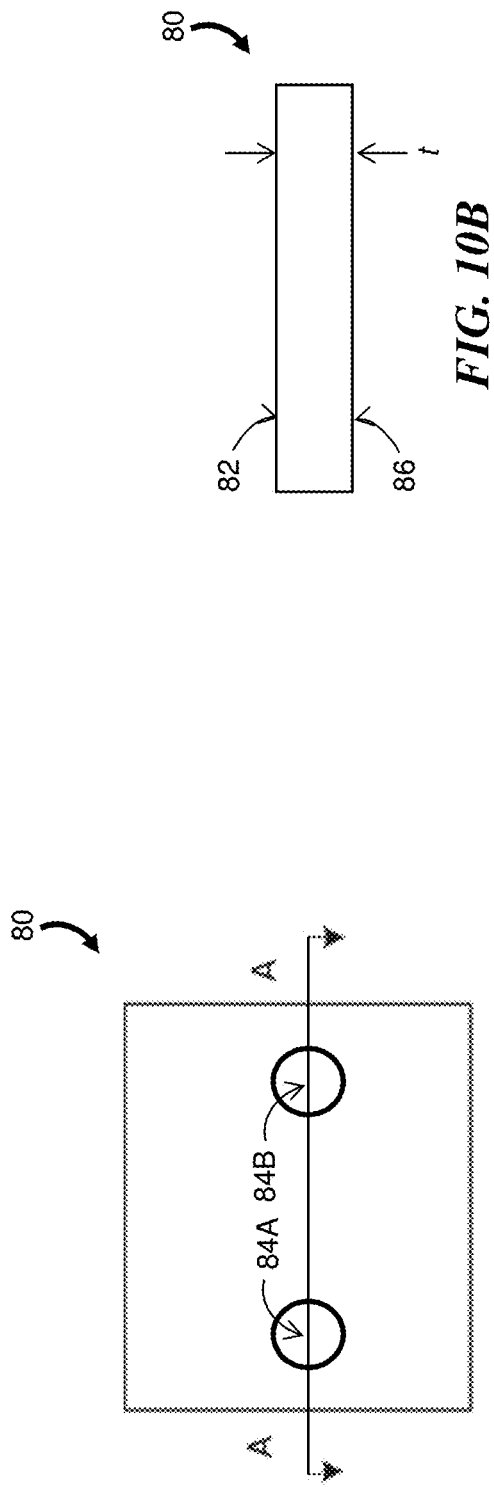

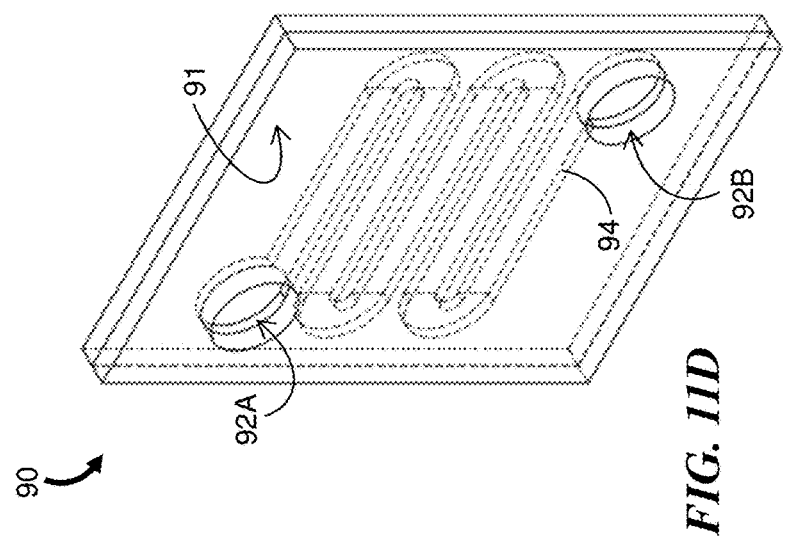
FIG. 11D
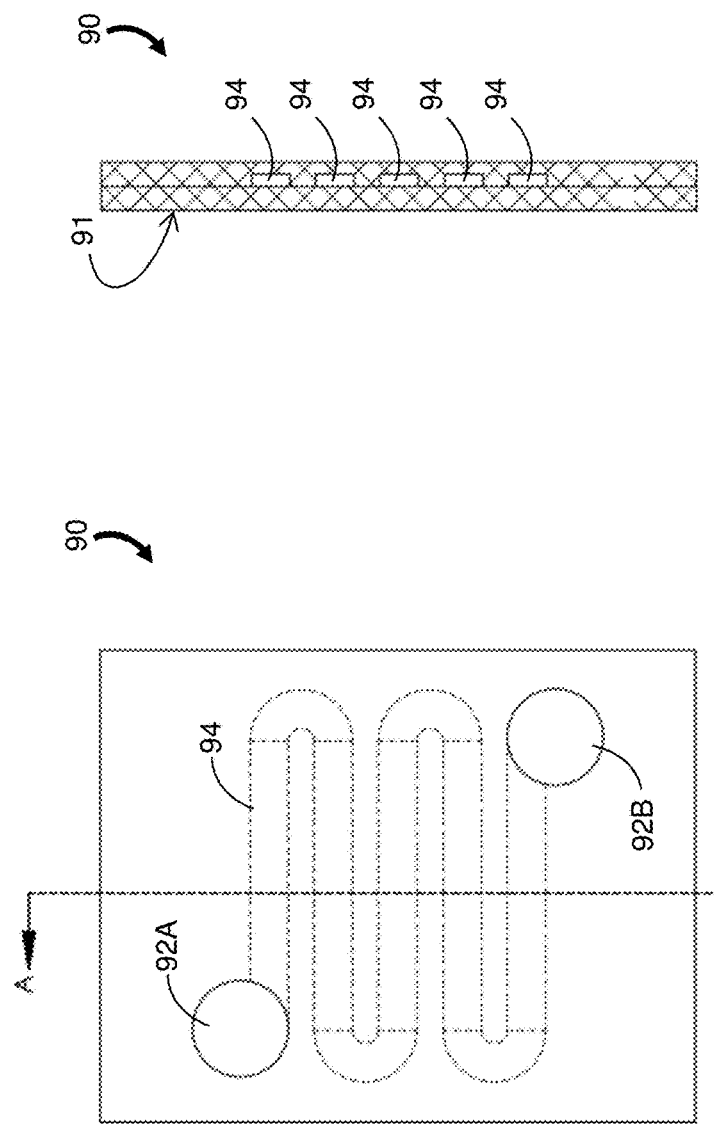
FIG. 11B
FIG. 11A
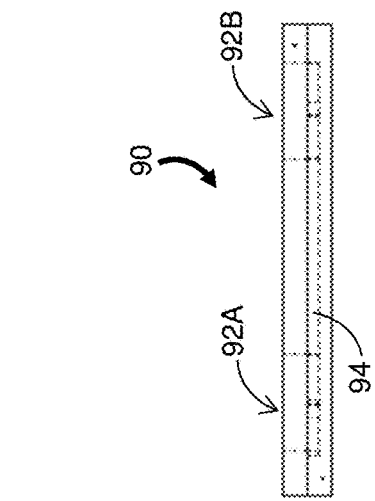
FIG. 11C

HIGH SAMPLE THROUGHPUT DIFFERENTIAL SCANNING CALORIMETER

RELATED APPLICATIONS

This application is a non-provisional patent application claiming priority to U.S. Provisional Patent Application No. 62/748,682, filed Oct. 22, 2018, entitled "High Sample Throughput Differential Scanning calorimter" which is incorporated herein by reference.

FIELD OF THE INVENTION

The technology generally relates generally to calorimetry systems. More particularly, the technology relates to a differential scanning calorimeter instruments having a high sample throughput.

BACKGROUND calorimeters are instruments that may be used to measure changes in the energy of a sample of a material by measuring the heat flow between the sample and its surroundings. A differential scanning calorimeter (DSC) is a type of calorimeter instrument that can be used to measure properties of biologic sample, nano-sized materials and polymers. Heat flows associated with heating or cooling a sample or with thermal transitions in samples may be determined. DSCs typically have at least one sample cell and at least one reference cell. In a typical DSC measurement, the temperatures of a sample cell and a reference cell are increased or decreased in a controlled manner, although some measurements may be done at a single temperature. In temperature ranges in which the sample does not undergo a transition, the heat capacity of the sample may be measured by measuring the differential heat flow needed to heat or cool the sample compared to the reference. When the temperature of the sample and of the reference is changed such that the sample reaches a transition temperature associated with heating or cooling caused by an exothermic or endothermic phase transition, the differential heat flow to or from the sample compared to the heat flow to or from the reference may be used to determine the transition temperature and to calculate the enthalpy of the transition. Similarly, when the sample includes biomolecules, factors associated with the folding and stability of biomolecules may be determined by DSC measurements.

Some conventional DSC instruments are limited to analyzing a single sample during an instrument measurement period. Depending upon the temperature change over time, the time required to analyze a single sample may extend from several minutes to many hours. As a result, conventional DSC instruments have low sample analysis throughout. Another disadvantage of some DSC instruments, including instruments commonly used for biological analysis, is the need to clean calorimeter components that may come in contact with the sample to reduce cross-contamination. This cleaning can further limit the ability to analyze large numbers of samples as it adds significant delay between sample measurement runs.

SUMMARY

In one aspect, a thermo-analytical instrument includes a first thermal substrate, a temperature control module and a plurality of second thermal substrates. The first thermal substrate provides a substantially uniform temperature across a surface of the thermal substrate. The temperature control module is in thermal communication with the first thermal substrate and controls a temperature of the first thermal substrate. Each of the second thermal substrates is in thermal communication with the surface of the first thermal substrate and provides a substantially uniform temperature across a surface of the second thermal substrate. Each of the second thermal substrates is configured to receive a reference cell and a sample cell.

The first thermal substrate may comprise a plurality of layers of thermally conductive material wherein one or more of the layers has a thermal conductivity that is different from a thermal conductivity of one of the other layers. The layers may be diffusion-bonded to each other.

The thermo-analytical instrument may further include, in thermal communication with each of the second thermal substrates, a reference platform to receive the reference cell and a sample platform to receive the sample cell with each of the reference and sample platforms configured to receive a temperature sensor. Each of the reference and sample platforms may be configured to receive a heater element.

In another aspect, a DSC instrument includes a temperature control plate, a temperature control module and a plurality of DSC units. The temperature control plate has a plurality of layers of thermally conductive material with at least one of the layers having a thermal conductivity that is different from a thermal conductivity of one of the other layers. A temperature of a surface of the temperature control plate is substantially uniform across the surface. The temperature control module is in thermal communication with the temperature control plate. Each of the DSC units is in thermal communication with the temperature control plate and includes a reference platform for receiving a reference cell and a sample platform for receiving a sample cell.

The layers may be diffusion bonded to each other. One of layers may be in contact with the DSC units and have a higher thermal conductivity than at least one of the other layers in the temperature control plate.

The temperature control module may be configured to control a temperature of the temperature control plate according to a predetermined temperature change over time. The temperature control module may include a heating layer in thermal communication with the temperature control plate and the heating layer may include a film resistance heater. The temperature control module may further include a cooling layer in thermal communication with the temperature control plate. The heating layer may include one or more openings through which the cooling layer is in thermal communication with the temperature control plate. A heat sink may be in thermal communication with the cooling layer. The DSC instrument may include one or more fans configured to generate an air flow along the heat sink.

Each of the reference platform and the sample platform may have a heater element and/or a temperature sensor.

Each DSC unit may include a vertical stack in thermal communication with the temperature control plate. The vertical stack includes a plurality of layers of thermally conductive material with at least one of the layers having a thermal conductivity that is different from a thermal conductivity of one of the other layers. The vertical stack may include a plurality of diffusion bonded layers.

Each of the DSC units may include a first thermoelectric device disposed between the reference platform and the vertical stack, and a second thermoelectric device disposed between the sample platform and the vertical stack. The first thermoelectric device is configured to generate a first signal indicative of a heat flow between the reference platform and the vertical stack and the second thermoelectric device configured to generate a second signal indicative of a heat flow between the sample platform and the vertical stack. The first and second thermoelectric devices may be Peltier modules.

In another aspect, a sample chip for use with a differential scanning calorimeter includes a body having a first surface and a second surface opposite to the first surface, with the second surface configured to contact a sample platform of the differential scanning calorimeter. The sample chip further includes an internal void disposed between the first surface and the second surface and extending from a first port on the first surface. The internal void is configured to receive a sample to be analyzed by the differential scanning calorimeter.

The sample chip may further include a second port for the interval void on the first surface. The sample chip may be made of a chemically inert material.

The internal void may be a microfluidic channel and the microfluidic channel may have a serpentine path.

In another aspect, a chip tray for a DSC instrument includes a frame that includes a thermally-insulating material and has a top surface, a bottom surface and a plurality of apertures extending between the top and bottom surfaces. Each of the apertures is in the frame at a position that is aligned with a DSC unit when the chip tray is loaded into the DSC instrument so that at least one of a reference platform and a sample platform extends through the aperture when the frame is inserted into the DSC instrument. Each of the apertures has one or more support elements to hold a sample chip or a reference chip.

Each support element may include a recessed surface extending around at least a portion of a perimeter of the aperture and configured to engage the bottom surface of the sample chip or the reference chip. The support elements may include at least two tabs each extending into the aperture from a perimeter of the aperture and be configured to engage the bottom surface of the sample chip or the reference chip.

The chip tray may further include one or more protective layers removably attached to the frame to protect one or more of the sample chips.

BRIEF DESCRIPTION OF THE DRAWINGS

The above and further advantages of embodiments of the present inventive concepts may be better understood by referring to the following description in conjunction with the accompanying drawings, in which like reference numerals indicate like elements and features in the various figures. Appended alphabetic characters may be used to distinguish between two or more like elements or features in a drawing. For clarity, not every element may be labeled in every figure. The drawings are not necessarily to scale, emphasis instead being placed upon illustrating the principles of features and implementations.

FIGS. 10A, 10B and 10C are a top view, a side view and a cross-sectional view, respectively, of an embodiment of a sample chip that can be used with the DSC instrument of FIG. 8.

FIGS. 11A, 11B, 11C and 11D are a detailed top, a cross-sectional view, a side and a perspective view, respectively, of another embodiment of a disposable sample chip.

DETAILED DESCRIPTION

Figure 1:
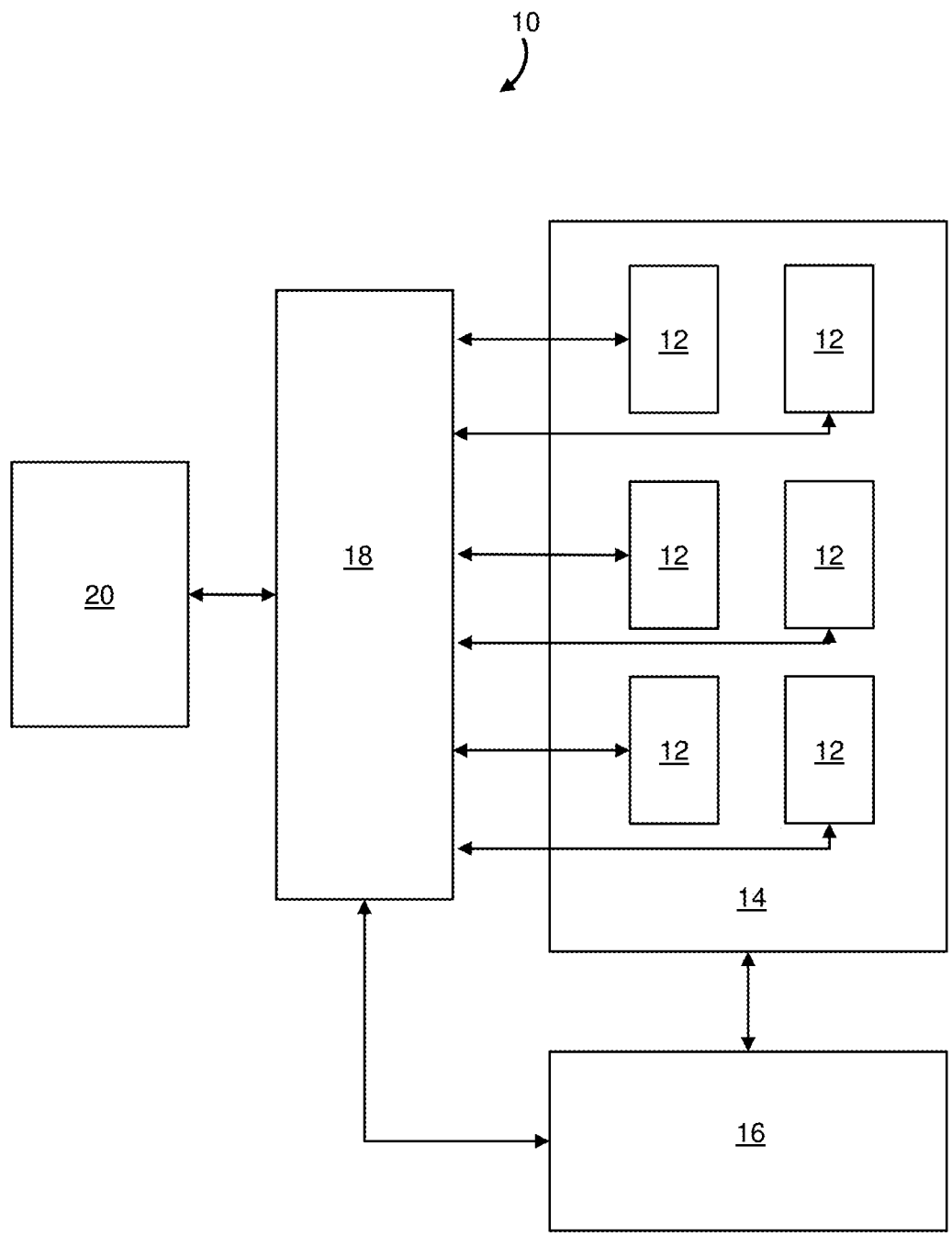
FIG. 1 is a functional block diagram of an embodiment of a DSC instrument.

Reference in the specification to an "embodiment" or "example" means that a feature, structure or characteristic described in connection with the embodiment is included in at least one example of the teaching. References to an embodiment within the specification do not necessarily all refer to the same embodiment.

In brief overview, embodiments disclosed herein are directed to a differential scanning calorimeter (DSC) instrument capable of performing analyses of multiple samples at the same time. As used herein, a DSC is a thermo-analytical instrument that measures the amount of heat required to increase (or decrease) the temperature of a sample and reference as a function of temperature. Typically, the temperatures of the sample and the reference are increased (or decreased) linearly in a predetermined way over time, although this is not a requirement. Some embodiments of DSC instruments described herein include a thermal substrate that provides a substantially uniform temperature across a surface of the substrate. A plurality of DSC units is in thermal communication with the substrate, for example, by mounting directly to the surface of the substrate. Each DSC unit includes a reference platform and a sample platform to receive a reference cell and a sample cell, respectively. The reference and sample cells may be formed of a material having a well-defined heat capacity over the range of temperatures used for analysis. The sample cell includes a volume to receive a sample to be analyzed. For example, the volume may be an internal chamber or a fluidic channel in a block of material that is to hold the sample during the measurement. In some embodiments, the reference cell has a similar or identical structure to the sample cell.

Advantageously, DSC instruments described herein enable many samples to be analyzed simultaneously in a single instrument. Thus, sample throughput is significantly increased and differences in samples analyzed at different times due to sample aging do not occur. In addition, some embodiments of DSCs described below utilize sample cells in the form of disposable chips which eliminate the need to clean the sample cells after measurement of one set of samples and prior to measurement of the next sample set. These disposable chips may be loaded in a chip tray for easy loading in and removal from the DSC instrument.

The present teaching will now be described in more detail with reference to embodiments shown in the accompanying drawings. While the present teaching is described in conjunction with various embodiments, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

FIG. 1 is a functional block diagram of an embodiment of a DSC instrument 10. The instrument 10 includes multiple DSC units 12, a thermal substrate (temperature control plate) 14, a temperature control module 16, a processor 18 and a user interface (UI) module 20. As used herein, a single DSC unit measures heat flows associated with heating or cooling an individual sample, and/or the heat flow associated with thermal transitions in the individual sample.

In some instances, a DSC unit 12 includes a single reference cell and further includes a single sample cell that receives a sample to be analyzed. Each DSC unit 12 is in thermal communication with the temperature control plate 14. For example, each DSC unit 12 may be mounted to a surface of the temperature control plate 14 to establish direct thermal communication by contact. The temperature control module 16 may include one or more heating and/or cooling devices in thermal communication with the temperature control plate 14 to control a temperature of the plate 14. In some embodiments, the temperature control plate 14 and DSC units 12 are provided in an enclosure to achieve thermal and pressure isolation from the local environment.

The processor 18 is in communication with the temperature control plate 14 and the DSC units 12. The processor 18 may transmit and receive digital and/or analog signals to and from the temperature control module 16 to control the temperature of the surface of the temperature control plate 14 in a desired way. Additionally, the processor 18 may transmit and receive digital and/or analog signals to and from the DSC units 12. The signals may represent different parameters, including a temperature of one or more components of each DSC unit 12 and/or the heat flows to or from components of each DSC unit 12. In some instances, one or more signals issued from the processor 18 may be used to control power applied to thermoelectric devices in the DSC units 12 when the instrument 10 is operated in a power compensation mode, as described below.

The UI module 20 is in communication with the processor 18 and may be accessed by an operator to program or control the operation of the DSC instrument 10. For example, the UI module 20 may be used to program a temperature of the temperature control plate 14 as a predetermined function of time. Optionally, the UI module 20 may be used to control positioning equipment (e.g., a robotic system) used to load samples in the instrument 10 and/or remove samples from the instrument 10.

During operation of the DSC instrument 10, the temperature of the DSC units 12 is controlled, at least in part, by controlling the temperature of the temperature control plate 14. For example, a heater can be used to increase the plate temperature in a controlled way, such as by implementing a linear temperature ramp. In addition, each DSC unit 12 may be operated in a power compensation mode or a heat flux (i.e., heat conduction) mode. In the power compensation mode, power is applied to a sample heater or reference heater to increase the temperature of a sample cell or a reference cell, respectively, in response to a signal indicative of a difference in the temperatures of the sample and reference cells. For example, power may be applied so that the signal continuously indicates a temperature difference of zero. Thus, measurement data may be obtained by measuring the applied power. In the heat flux mode, active power control to the cells is not used. Instead, the heat flow between the sample cell and the temperature control plate 14 is measured and the heat flow between the reference cell and the temperature control plate 14 is measured. A measurement of the difference in the two heat flows may be made to acquire measurement data. In some embodiments, an operator can configure the DSC instrument 10 to operate in either mode for a measurement period. The preferred mode may be determined according to the types of samples to be measured and the analysis to be performed.

In either mode of operation, a differential signal may be generated. For example, a signal responsive to the difference in the voltages across the two thermoelectric devices can be generated when operating in the power compensation mode. Power is applied to a heater element in the sample cell to maintain the difference in the two voltages at zero. The applied power may be measured to obtain calorimetric measurement data. Alternatively, in heat conduction mode, a signal indicating the difference in the two voltages is measured to obtain the calorimetric measurement data. Use of a difference signal in either mode reduces or eliminates the thermal noise introduced into the instrument 10 due to transient thermal noise in the local environment of the DSC unit 12.

As illustrated, the DSC instrument 10 includes six DSC units 12. It will be appreciated that other numbers of multiple DSC units 12 may be used. The DSC units 12 are shown arranged in a 3×2 array; however, other configurations are possible, including groupings that are not arranged according to a rectangular grid array. For manufacturing convenience and efficient operation (e.g., loading and unloading of samples), a rectangular array of DSCs may be preferred.

Figure 2:
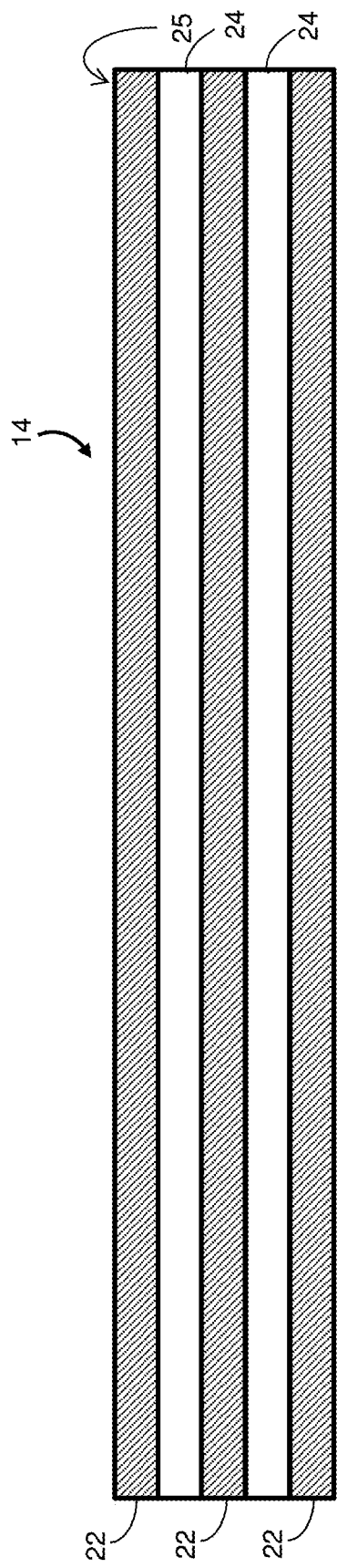
FIG. 2 is a cross-sectional side view illustration of the temperature control plate in the DSC instrument of FIG. 1.

FIG. 2 is a cross-sectional side view illustration of the temperature control plate 14. Instead of being machined from a single metal block, the plate 14 includes multiple metallic layers that are diffusion-bonded together to produce a metallic block having a higher thermal conductivity laterally across the block than vertically through the block. U.S. Patent Publication No. 2017/0227480 A1, incorporated herein by reference, describes embodiments of metallic blocks that may be used as the temperature control plate 14. For example, the metallic layers may include layers 22 of a highly thermally conductive metal, such as copper, silver, gold or aluminum, alternating with layers 24 of a less thermally conductive metal, such as stainless steel, Inconel, bronze or titanium. In one specific embodiment, the temperature control plate 14 may have a first layer of copper, a second layer of stainless steel, a third layer of copper, a fourth layer of stainless steel and a fifth layer of copper. Other numbers of alternating layers may be used and more than two layer materials may be used. In some implementation, the layers may not be arranged in an alternating structure as long as the surface 25 that receives the DSC units 12 has high thermal conductivity relative to one or more of the other layers.

Figure 3:
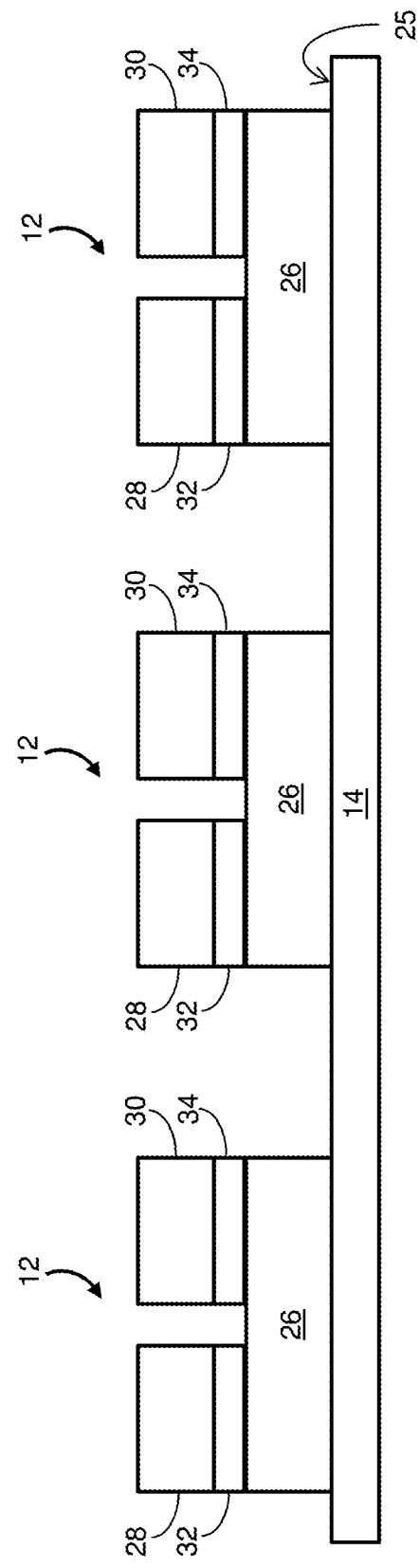
FIG. 3 is a cross-sectional side view illustration of a single row of DSC units and the temperature control plate in the DSC instrument of FIG. 1.

FIG. 3 is a cross-sectional side view illustration of a single row of the DSC units 12 of FIG. 1 mounted on the top surface 25 of the temperature control plate 14. Each DSC unit 12 includes a vertical stack 26 of layers of different thermally-conductive materials, similar to the vertical structure described above for the temperature control plate 14. Preferably, the upper and lower surfaces of each vertical stack 26 are formed of the layer material having the greatest thermal conductivity. Each vertical stack 26 act as a thermal substrate "island" that enables high performance operation of a corresponding DSC unit 12 and provides additional isolation during measurement periods from thermal fluctuations caused by other DSC units 12 in the instrument 10.

As the temperature of the plate 14 is heated (or cooled), heat is conducted vertically upward (or downward for cooling) through the plate 14 and is rapidly conducted laterally in the highest thermal conductivity layers. This allows the top surface 25 of the plate 14 to be increased (or decreased) to a temperature that is nearly constant regardless of position on the surface 25. Thus, a thermal substrate, such as the temperature control plate 14, and thermal substrate islands, such as the vertical stacks 26, cooperate to provide a sufficiently uniform and controlled temperature environment of the DSC units 12 and isolation of the individual DSC units 12.

Each DSC unit 12 includes a reference platform 28 for receiving a reference container, optionally a reference chip, and a sample platform 30 for receiving a sample container, optionally a sample chip. The reference container and sample container are alternatively referred to as a reference cell and a sample cell, respectively. In one embodiment, the platforms 28 and 30 are formed of aluminum. Preferably, the reference and sample cells are similar in structure, size and material composition. During operation of the DSC instrument 10, the reference cells are typically empty while some or all the sample cells include samples to be analyzed. In some embodiments, the reference cells may differ in structure from the sample cells. For example, the reference cells may be solid blocks while the sample cells may include an internal void, such as a chamber or fluidic channel, to receive a liquid sample.

The reference platform 28 of each DSC unit 12 is separated from its sample platform 30 by a gap sufficient to avoid a thermal link between platforms. Each reference platform 28 and each sample platform 30 has a smooth, flat surface to promote continuous contact with the reference cell and the sample cell, respectively. In addition, each platform 28 and 30 includes a heater element, such as a precision wire wound resistor, and a temperature sensor, such as a thermistor, that are used in a thermal calibration of the DSC unit 12. Shown as rectangular blocks, in other embodiments the reference platforms 28 and sample platforms 30 have other shapes and are sized to receive reference and sample cells of different shapes and sizes.

Each DSC unit 12 includes a reference thermoelectric device 32 and a sample thermoelectric device 34. The reference thermoelectric device 32 is positioned between the reference platform 28 and vertical stack 26, and the sample thermoelectric device 34 is positioned between the sample platform 30 and vertical stack 26. The thermoelectric devices 32 and 34 may be solid state devices such as Peltier modules. Each thermoelectric device 32 or 34 may be used to determine heat flow according to a voltage measured across the device.

Figure 4:
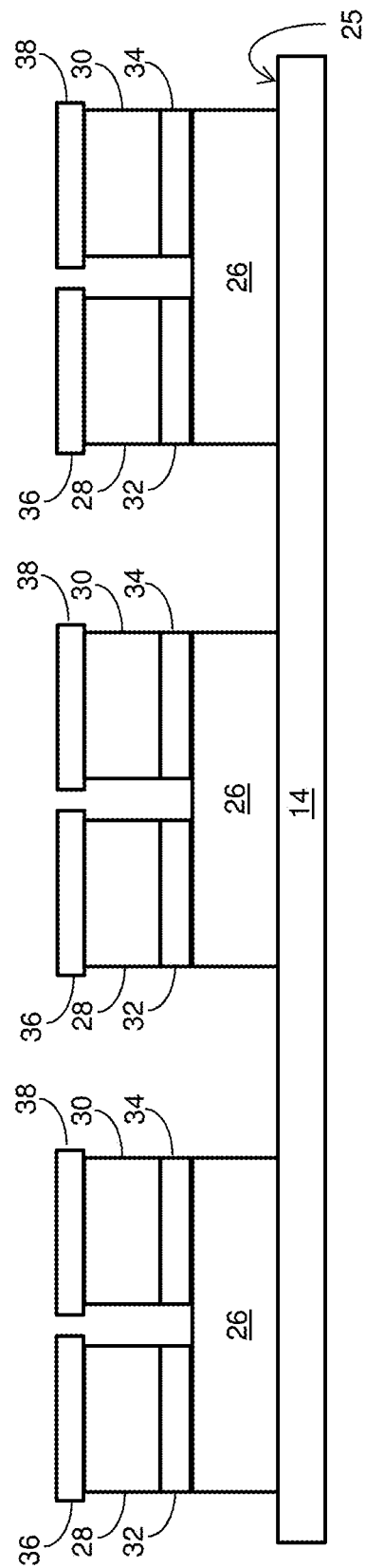
FIG. 4 is an illustration of the DSC units and temperature control plate of FIG. 3 with the addition of a reference chip and a sample chip for each DSC unit.

FIG. 4 is an illustration of the DSC units 12 and temperature control plate 14 of FIG. 3 with the addition of a reference cell 36 and sample cell 38, in the form of a reference chip and a sample chip, respectively, for each DSC unit 12. The cross-sectional areas of the reference and sample chips 36 and 38 are oversized relative to the reference and sample platforms 28 and 30, respectively. Consequently, a portion of each chip 36 or 38 overhangs its platform and can be used to easily load the chip into and remove the chip from the DSC unit 12. For example, a chip tray for loading and unloading multiple chips at one time, as described in detail below, can include openings with tabs that engage the overhanging portions of the chips.

The reference chip 36 and the sample chip 38 are preferably held in position on each DSC unit 12 by application of a force, such as a force applied by a clamping device. The clamping force presses the chips 36 and 38 against the top surfaces of their platforms 28 and 30, respectively, to improve contact and thermal conductivity. The clamping device may act in combination with a chip tray.

Figure 5:
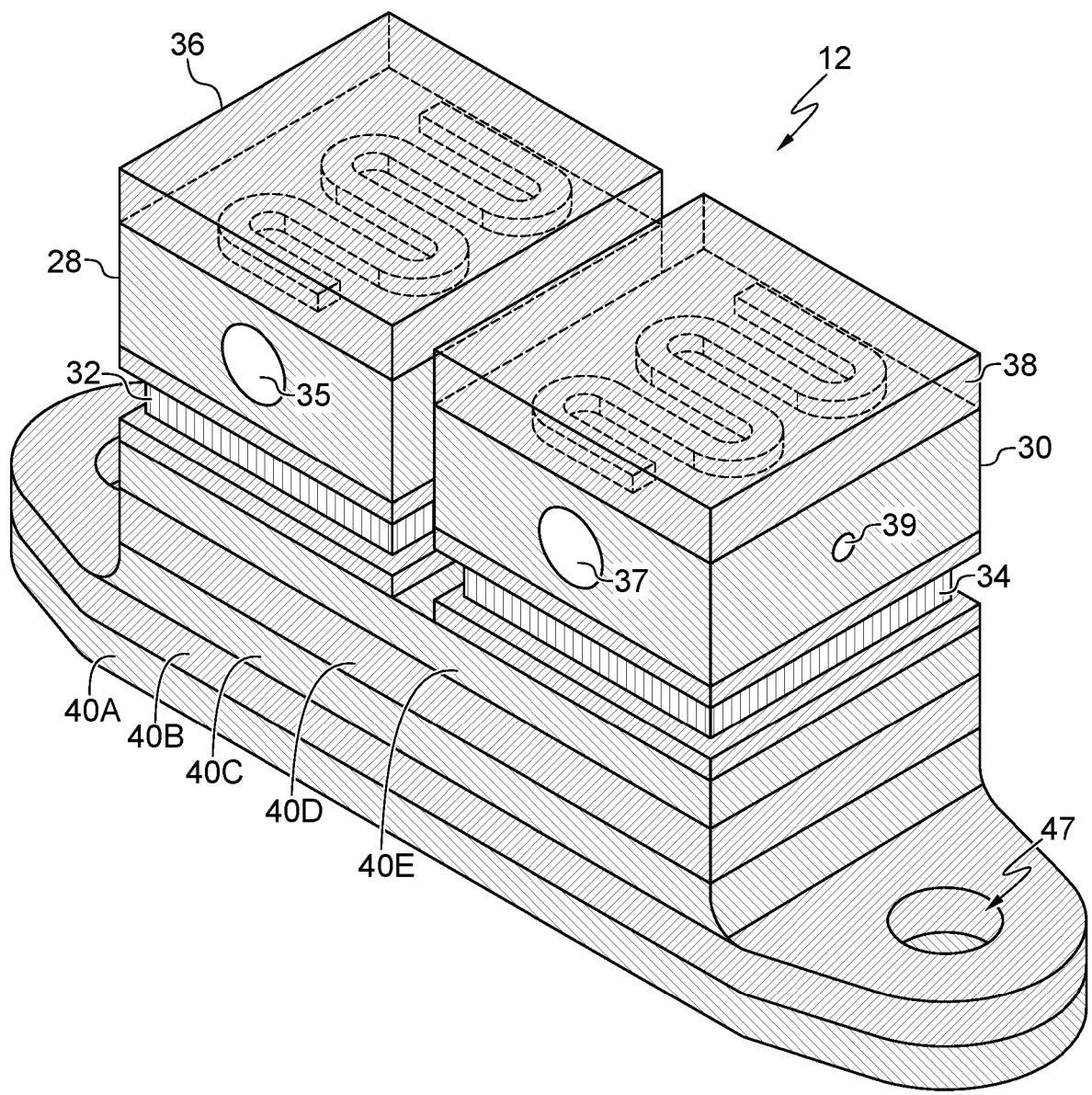
FIG. 5 is a perspective detailed view of an example of a DSC unit.

FIG. 5 is a perspective detailed view of a DSC unit 12. The vertical stack 26 (see FIG. 4) includes a diffusion-bonded block of five alternating layers 40A to 40E of materials with adjacent layers having different thermal conductivities, as described above. For example, the first, third and fifth layers 40A, 40C and 40E may be copper layers and the second and fourth layers 40B and 40D may be stainless steel layers. The first and second layers 40A and 40B extend laterally at the base of the stack and include two through-holes 47 to receive a fastening element, such as a screw or bolt, for fastening the DSC 12 to the temperature control plate 14.

The reference and sample platforms 28 and 30 are shown with openings 35 and 37, respectively, which are sized to receive a heater element. The heater elements can be used in a calibration operation for determining a temperature response of the DSC unit 12. The heater elements can also be used to apply power (thermal energy) when operating in a power compensation mode, as described above. The platforms 28 and 30 also have an opening 39 (only visible in the figure on the sample platform 30) to receive a temperature sensor, for example, a thermistor, that can be used to actively monitor the platform temperature during calibration and normal instrument operation.

Figure 6:
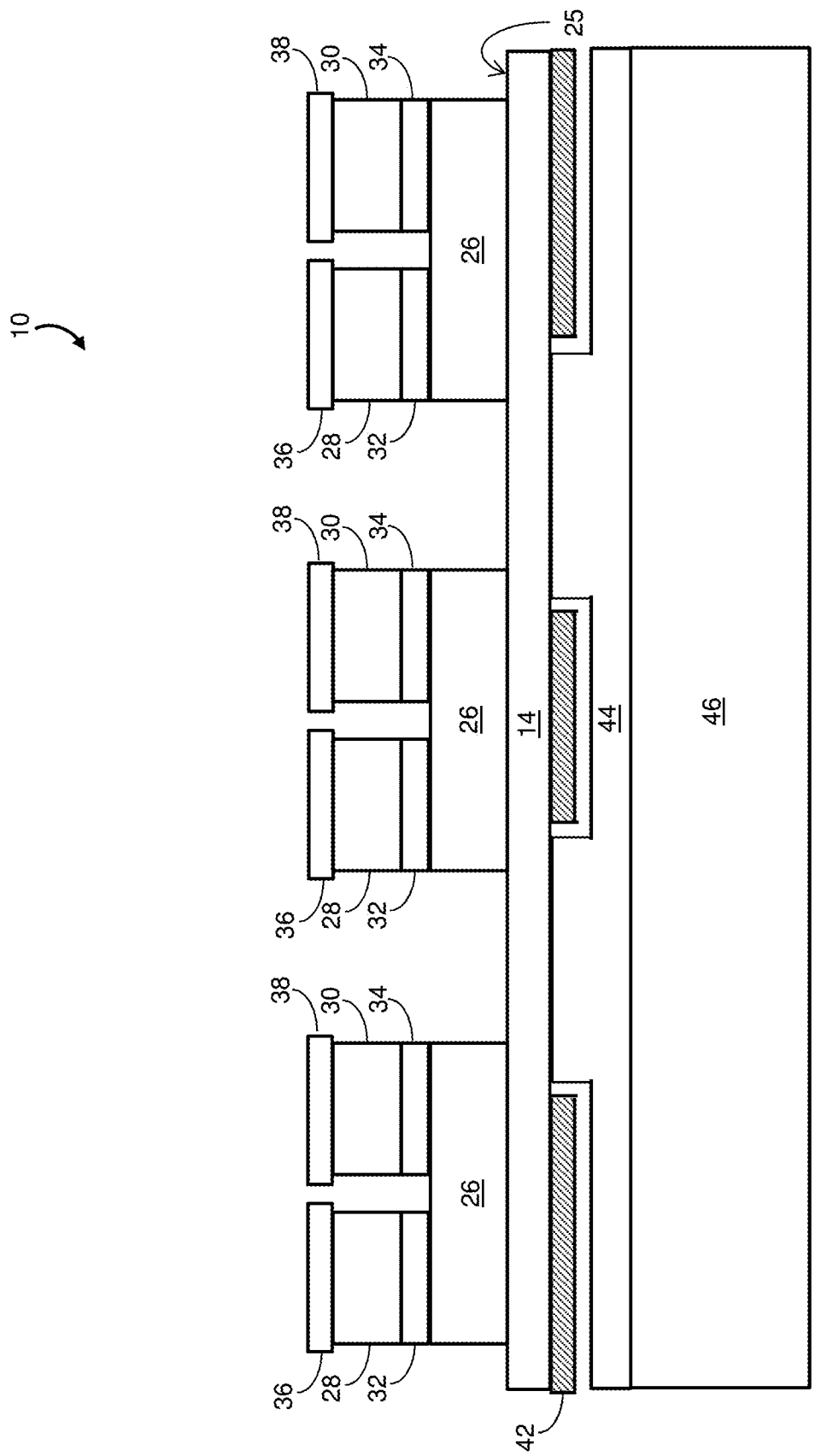
FIG. 6 is a block diagram of the DSC instrument of FIG. 4 and shows additional features that include a heating layer and a cooling layer.
Figure 7:
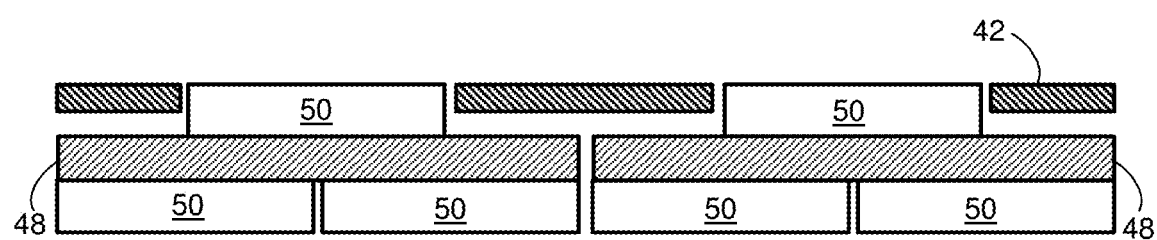
FIG. 7 is a side view illustration of an example of the heating and cooling layers of FIG. 6.

FIG. 6 is a block diagram of the DSC instrument 10, illustrating components similar to those shown in FIG. 4 and additional features, including a heating layer 42, a cooling layer 44 and a heat sink 46. The term "layer" is used here to indicate relative position to other features of the instrument without requirement the physical structure to be in the form of a layer. The heating layer 42 is disposed directly underneath and in contact with the temperature control plate 14. In one embodiment, the heating layer 42 includes one or more film resistance heaters such as a silicone heater or a polyimide film heater (e.g., a Kapton® heater). Although shown schematically in the figure as being primarily below the heating layer 42, the cooling layer 44 is also in direct contact with the bottom of the temperature control plate 14 through openings in the heating layer 42 as described in more detail below with respect to FIGS. 7 and 9. Thus, the heating and cooling layers 42 and 44 are both in direct contact with the plate 14 but are not in contact with each other.

The heating layer 42 is configured to actively heat the temperature control plate 14 during instrument operation when measurement data are acquired from the DSC units 12. The heating layer 42 is controlled by the temperature control module 16 (FIG. 1) and causes the temperature of the plate 14 to change in a predetermined way over time (e.g., according to a temperature profile or temperature ramp).

The cooling layer 44 operates to reduce the temperature of the temperature control plate 14. In some implementations, the cooling layer 44 is used to rapidly reduce the plate temperature to a starting temperature before performing a next measurement cycle with the DSC instrument 10. FIG.

7 is a side view showing one example of the heating layer 42 and the cooling layer 44 which has four plates 48, although only two are visible in the figure. Each plate 48 is made of a high thermal conductivity material such as copper and has multiple attached Peltier modules 50. The Peltier modules 50 on top of each plate 48 are in direct contact with the temperature control plate 14 through corresponding openings in the heating layer 42. During calorimeter measurements, the heating layer 42 is active and applies heat to temperature control plate 14 in a predetermined way over time while the Peltier modules 50 are disabled. During a cooling cycle, typically after completion of measurements and prior to a subsequent measurement period, the heating layer 42 is disabled and the Peltier modules 50 are activated to rapidly cool the temperature control plate 14. The lower side of the lower Peltier modules 50 are in thermal communication with the heat sink 46 to conduct the heat from the devices 50. In other embodiments, the structure of the cooling layer 44 is different. For example, the number of plates 48 and number of thermoelectric devices 50 used can vary to accommodate different thermal loads for the temperature control plate 14 and the desired cooling rate.

The heat sink 46 includes a metal block having high thermal conductivity. In some implementations, the thermal block has a plurality of cooling fins to improve the cooling efficiency. Optionally, one or more sources of air flow, such as a cooling fan, may be used to provide airflow over the cooling fins. Preferably, the sources of air flow are disabled during measurement periods to prevent the introduction of thermal noise that may affect the DSC units 12 and degrade the accuracy of the measurement data. For example, thermal noise due to temporal temperature variations in the air flow to the heat sink caused by room temperature fluctuations is avoided by disabling the air flow during measurements. According to an alternative implementation, one or more flows of a liquid coolant are provided to remove heat from the heat sink 46.

Figure 8:
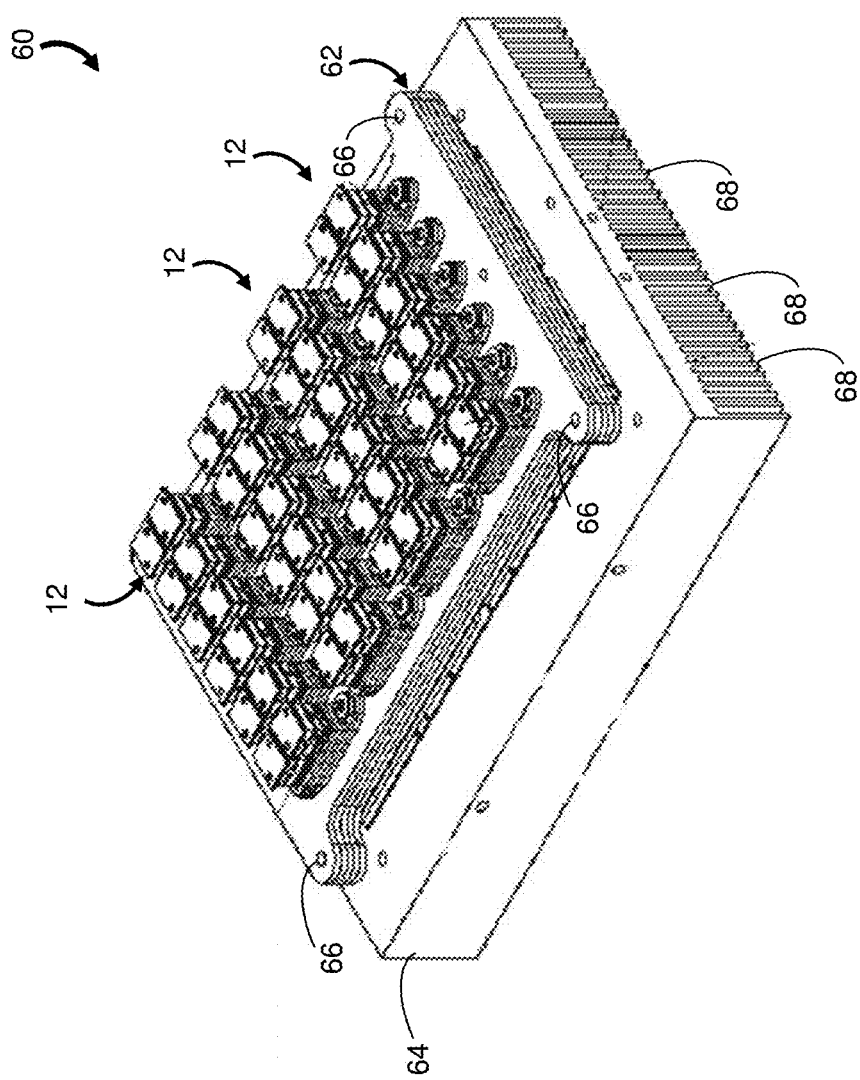
FIG. 8 is a detailed perspective view of another embodiment of a DSC instrument.
Figure 9:
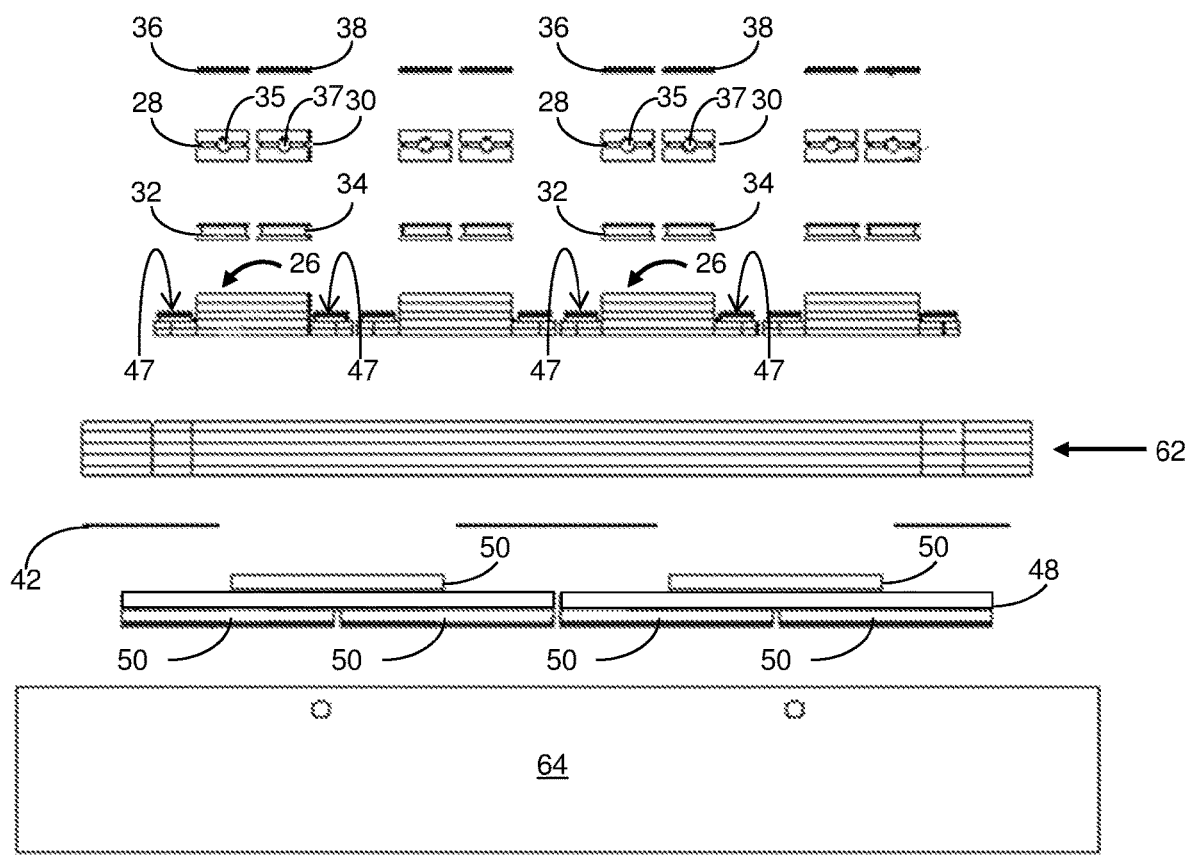
FIG. 9 is an exploded side view of the DSC instrument of FIG. 8.

FIG. 8 is a detailed perspective view of another embodiment of a DSC instrument 60 (shown without a processor and UI module). The instrument 60 includes 24 DSC units 12 arranged in a 4×6 array configuration. FIG. 9 is an exploded side view of the instrument portion of FIG. 8 and shows four DSC units 12 in a single row. These two figures show various features discussed above with respect to the block diagrams of FIGS. 2 to 7. Each DSC unit 12 is mounted to the temperature control plate 14 using screws or bolts through holes 47 in the bottom layers of the vertical stack, as described above. The temperature control plate 62 includes alternating layers of different thermal conductivity and is mounted to the top of the heat sink 64 using screws or bolts that pass through holes 66. Cooling fins 68 extend vertically downward from the upper portion of the heat sink 64 and are arranged to receive a cooling air flow outside times when measurements occur.

Noting that the time to analyze a single sample on some conventional DSC instruments ranges from several minutes to a few hours, it can be recognized that the illustrated instrument 60 provides a substantial increase in sample measurement throughput according to the number of DSC units 12.

FIGS. 10A, 10B and 10C are a top view, side view and cross-sectional view, respectively, of an embodiment of a sample chip 80 that can be used with the DSC instrument 60 of FIG. 8. The sample chip 80 includes a block having a top surface 82 with two ports 84A and 84B, and a bottom surface 86. Preferably, the block material is made of an inexpensive chemically inert material that can be easily manufactured to the desired structure and which avoids any chemical interaction with the sample. Examples of chemically inert block material include fused silica, silicon and polydimethylsiloxane. Although such materials have poor thermal conductivity compared to metals, the chip thickness results in a relatively small impact to instrument performance. Due to the small thickness of the chip 80, the thermal conductivity is of less concern than for other components of the system. Optionally, a more thermally-conductive layer of material may be formed on the bottom surface of the sample chip 80. When the sample chip 80 is loaded on one of the DSC units 12, the bottom surface 86 is in contact with the top of the sample platform 30. Preferably, the bottom surface is smooth and flat to achieve continuous contact across the surface and to improve thermal conduction between the chip 80 and platform 30. In some embodiments, the thickness t of the chip 80 has a value in a range from about 0.5 mm to about 1.5 mm.

FIG. 10C shows a fluidic channel 88 that extends from one port 84A on the top surface 82 to an opposite end at the other port 84B. In alternative embodiments, the channel may be routed differently through the block and may have a chamber defined along the channel length to accommodate a greater sample volume. Sample can be introduced into the channel 88 through one of the ports 84 and air displaced from the channel 88 can exit the chip 80 at the other port 84. In some alternative embodiments, the sample chip has a single aperture to receive the sample. A known volume of sample may be inserted into the channel 88 using a pipette. By way of non-limiting numerical examples, a volume of the channel 88 may be in a range from about 10 μL to about 40 μL which is less than the volumes of sample cells for many conventional DSC instruments which sometimes use volumes of 300 μL or more. Optionally, a seal can be secured to the sample chip 80 on the top surface 82 to prevent vaporization of the sample before and during the sample analysis to prevent sample loss and to prevent a heat signal due to evaporation from the sample chip 80, thereby degrading thermal measurements. The seal can also prevent sample leaks and accidental spills that might otherwise contaminate other instrument components.

In some uses, the sample chips 80 are preloaded with samples at one location prior to delivery of the sample chips 80 to another location where the sample chips 80 are loaded into the DSC instrument for analysis. The loaded sample chips may be inserted into one or more trays for convenience in subsequent handling and transportation.

Preferably, the sample chip 80 is discarded after analysis of the sample is completed. Advantageously, there is no time expended for cleaning the sample chip 80 for a subsequent sample analysis and the opportunity for cross-contamination due to incomplete or ineffective cleaning of the sample chip 80 is substantially reduced or eliminated.

Reference chips can be manufactured to have a structure like that of the sample chip 80. For example, the reference chips can be loaded with a buffer and the sample chips loaded with the same buffer plus a protein to be analyzed. Optionally, the reference chips may not be loaded. In alternative embodiments, the reference chips do not include a channel or other internal volume. For example, the reference chips may be solid blocks of identical thermally conductive material without ports or any internal volume.

FIGS. 11A to 11D are detailed top, cross-sectional, side and perspective view, respectively, of another embodiment of a disposable sample chip 90. Two ports 92A and 92B are provided in the top surface 91. The body of the chip 90 may be made from a thermally conductive and preferably chemically inert material such as the examples of block materials provided above with respect to the sample chip 80 of FIGS. 10A to 10C. Optionally, a more thermally-conductive layer of material may be formed on the bottom surface of the sample chip 90. A serpentine channel 94 (e.g., a microfluidic channel) embedded in the chip 90 is indicated by dashed lines 94 and allows for a greater channel length than a sample chip having a direct channel path between ports.

Referring to the embodiments shown in FIG. 10A to FIG. 11C, control of the cross-sectional area of the channel 88 or 94 and the channel length allow the chip 80 or 90 to be manufactured to accommodate a desired sample volume. In some embodiments, the channel diameter or channel cross-section is selected to reduce or eliminate protein aggregation within the channel 88 or 94. The chip 80 or 90 may be covered or sealed with a film once loaded to prevent evaporation of the contained liquid which can distort the measurement signal. For example, a polyester adhesive film may be used to seal the chip 80 or 90.

The sample chips 80 or 90, and optionally the reference chips, may be loaded into the DSC instrument 60 (see FIG. 8) manually or automatically. Pressure is applied to each sealed chip 80 or 90 (e.g., 0.25 lb. per chip) to prevent evaporation. For example, a spring loaded rubberized element may be placed in contact with each chip 80 or 90 to apply the desired pressure.

Figure 12:
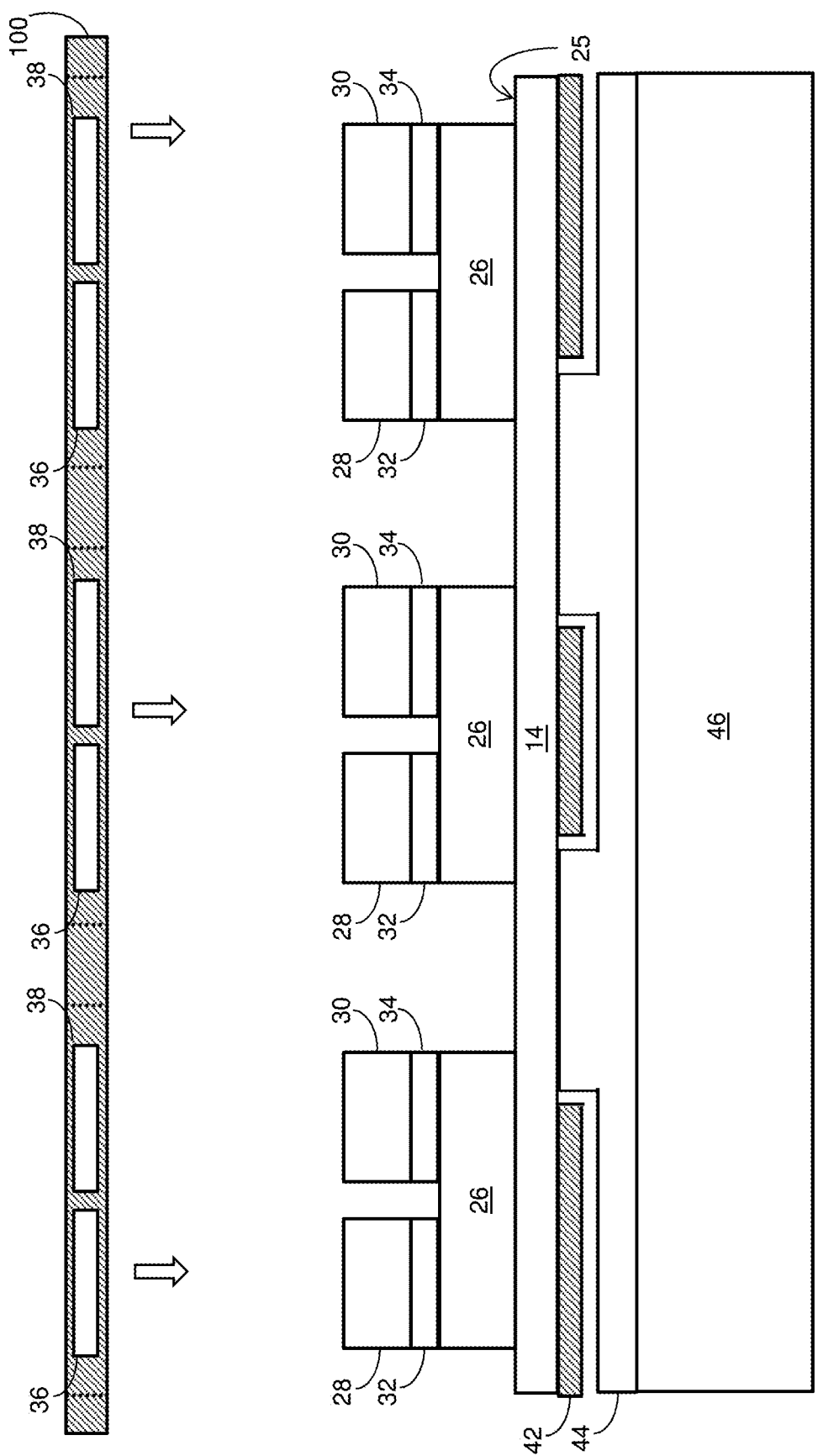
FIG. 12 is an illustration of an embodiment of a chip tray and the DSC instrument of FIG. 8 prior to the loading of the reference and sample chips into the instrument.

In one implementation, the sample chips 80 or 90 and reference chips are placed into position on the DSC units 12 using a chip tray. FIG. 12 is an illustration of an embodiment of a chip tray 100 and the DSC instrument 60 (see FIG. 8) prior to the loading of the chips 36 and 38 into the instrument 60 for measurement. The tray 100 is configured to be placed onto or adjacent to the DSC units 12 so that the reference chips 36 and the sample chips 38 are properly aligned to and received by the reference platforms 28 and sample platforms 30. Placement of the tray 100 may be manual or may be accomplished using an automated positioning system.

Figure 13:
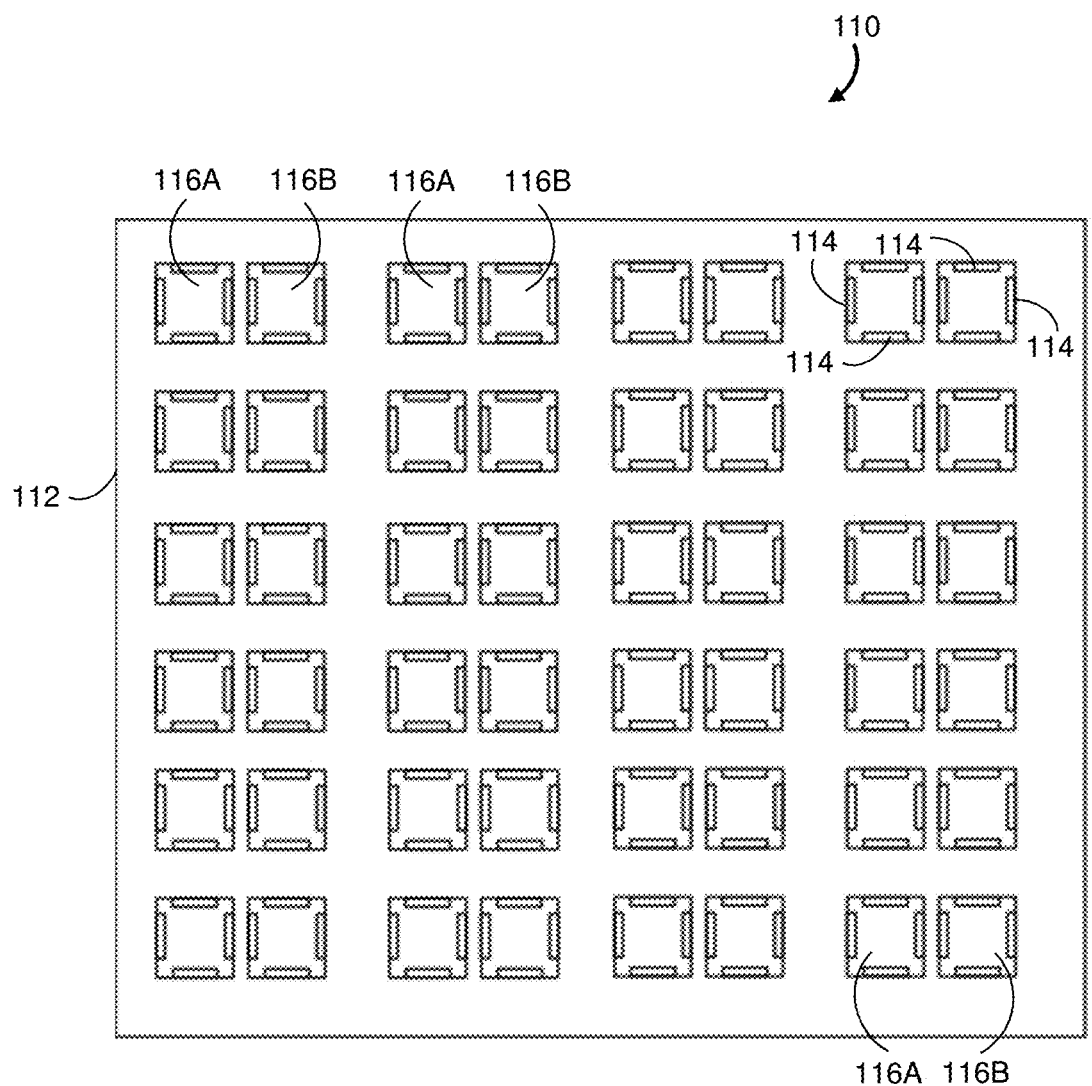
FIG. 13 is a top view illustration of an embodiment of a chip tray.

FIG. 13 is a top side illustration of another embodiment of a chip tray 110 that includes a frame 112 having 24 pairs of square openings (i.e., apertures) 116 and support elements (e.g., tabs) 114 extending from the frame 112 along a perimeter of each of the four sides of each aperture 116. One aperture 116A in each pair is configured to hold a reference chip and the other aperture 116B is configured to hold a sample chip. The tabs 114 are recessed below the top surface of the tray 110 so that each chip is supported by the tabs 114 in one of the apertures. Preferably, the frame 112 is fabricated from a material having a low thermal conductivity, that is, a thermally insulating material, to reduce or substantially eliminate thermal cross-talk between DSC units. The apertures 116 are dimensioned to pass the chips while the tabs 114 extend sufficiently into the apertures 116 to engage the bottom surface of each chip (e.g., overhanging chip portions); however, the separation between opposing tabs is greater than the corresponding dimension of the reference and sample platforms. Consequently, when the chip tray 110 is lowered into position over the DSC units, the reference and sample platforms pass through the apertures 116 and its tabs so that the top surfaces of the platforms engage the bottom surfaces of the reference and sample chips. The tray 110 optionally includes vertical support elements, such as support columns, that extend between some of the DSC units 12 down to the temperature control plate 14. When measurements are completed, the chip tray 110 can be lifted, manually or by an automated system, so that the tabs 114 again engage the chips and allow for the removal of the chips from the DSC instrument. Optionally, the chips may be locked in position in the tray 110. Used sample chips can be removed from the tray 110 and discarded or the entire tray and its chips may be discarded.

Although illustrated with four tabs 114, each extending from a side of an aperture 116, it should be recognized that other tray feature may be used to engage and disengage the chips. For example, the number of tabs 114 may be fewer or greater than illustrated. In other examples, a single rectangular aperture with structure to maintain the separation of the reference and sample chips from each other may be used or the tabs 114 may extend from the corners of the apertures 116.

In some embodiments, the chip tray 110 may be sealed with one or more protective layers after the samples are loaded. For example, the entire tray 110 may be sealed with a single protective layer, especially if all the sample chips are loaded with sample. In an alternative embodiment, only a portion of the sample tray may be sealed, for example, for apertures 116 populated by loaded sample chips. It should be noted that these protective layers are different from the film described above than can be used to seal an individual chip after it is loaded with a sample.

In another embodiment, the tray 110 may be partially or fully populated with empty sample chips and some or all these sample chips may be loaded while the chips remain in the tray 110. Subsets of the empty sample chips may be protected by a protective layer to prevent contamination before use. In this instance, the protective layer may be peeled back or otherwise removed to expose a subset of the sample chips for loading while other protective layers remained over other subsets of the chips to preserve them for sample loading and analysis at a later time. Each sample chip can be individually sealed once it is loaded with a sample.

While the invention has been shown and described with reference to specific examples, it should be understood by those skilled in the art that various changes in form and detail may be made therein without departing from the scope of the invention as recited in the accompanying claims.

What is claimed is:

1. A thermo-analytical instrument, comprising:
   a first thermal substrate for providing a substantially uniform temperature across a surface of the thermal substrate;
   a temperature control module in thermal communication with the first thermal substrate to control a temperature thereof; and
   a plurality of second thermal substrates each being in thermal communication with the surface of the first thermal substrate, each of the second thermal substrates providing a substantially uniform temperature across a surface of the second thermal substrate, and each of the second thermal substrates configured to receive both a reference cell and a sample cell.

2. The thereto-analytical instrument of claim 1, wherein the first thermal substrate comprises a plurality of layers of thermally conductive material wherein at least one of the layers has a thermal conductivity that is different from a thermal conductivity of one of the other layers.

3. The thermo-analytical instrument of claim 2, wherein the layers are diffusion-bonded to each other.

4. The thermo-analytical instrument of claim 1, further comprising, in thermal communication with each of the second thermal substrates, a reference platform to receive the reference cell and a sample platform to receive the sample cell, each of the reference and sample platforms configured to receive a temperature sensor.

5. The thereto-analytical instrument of claim 4, wherein each of the reference and sample platforms is configured to receive a heater element.

6. A differential scanning calorimeter (DSC) instrument, comprising:
a temperature control plate having a plurality of layers of thermally conductive material wherein at least one of the layers has a thermal conductivity that is different from a thermal conductivity of one of the other layers, wherein a temperature of a surface of the temperature control plate is substantially uniform across the surface;
a temperature control module in thermal communication with the temperature control plate; and
a plurality of DSC units each in thermal communication with the temperature control plate, each of the DSC units comprising both a reference platform for receiving a reference cell and a sample platform for receiving a sample cell.

7. The DSC instrument of claim 6, wherein the layers are diffusion bonded to each other.

8. The DSC instrument of claim 6, wherein one of the layers is in contact with the DSC units and has a higher thermal conductivity than at least one of the other layers in the temperature control plate.

9. The DSC instrument of claim 6, wherein the temperature control module is configured to control a temperature of the temperature control plate according to a predetermined temperature change over time.

10. The DSC instrument of claim 6, wherein each of the reference platform and the sample platform has a heater element.

11. The DSC instrument of claim 6, wherein each of the reference platform and the sample platform has a temperature sensor.

12. The DSC instrument of claim 6, wherein each DSC unit includes a vertical stack in thermal communication with the temperature control plate, the vertical stack comprising a plurality of layers of thermally conductive material wherein at least one of the layers has a thermal conductivity that is different from a thermal conductivity of one of the other layers.

13. The DSC instrument of claim 12, wherein the vertical stack comprises a plurality of diffusion bonded layers.

14. The DSC instrument of claim 12, wherein each of the DSC units includes a first thermoelectric device disposed between the reference platform and the vertical stack, and a second thermoelectric device disposed between the sample platform and the vertical stack, the first thermoelectric device configured to generate a first signal indicative of a heat flow between the reference platform and the vertical stack and the second thermoelectric device configured to generate a second signal indicative of a heat flow between the sample platform and the vertical stack.

15. The DSC instrument of claim 14, wherein the first and second thermoelectric devices are Peltier modules.

16. The DSC instrument of claim 6, wherein the temperature control module comprises a heating layer in thermal communication with the temperature control plate.

17. The DSC instrument of claim 16, wherein the heating layer comprises a film resistance heater.

18. The DSC instrument of claim 16, wherein the temperature control module further comprises a cooling layer in thermal communication with the temperature control plate.

19. The DSC instrument of claim 18, wherein the heating layer includes at least one opening and wherein the cooling layer is in thermal communication with the temperature control plate through the at least one opening.

20. The DSC instrument of claim 18, further comprising a heat sink in thermal communication with the cooling layer.

21. The DSC instrument of claim 20, further comprising at least one fan configured to generate an air flow along the heat sink.

* * * * *

UNITED STATES PATENT AND TRADEMARK OFFICE
CERTIFICATE OF CORRECTION

PATENT NO. : 11,474,055 B2
APPLICATION NO. : 16/598088
DATED : October 18, 2022
INVENTOR(S) : Donald J. Russell, David Serrell and Anthony E. Arnerich Page 1 of 1

It is certified that error appears in the above-identified patent and that said Letters Patent is hereby corrected as shown below:

In the Claims

Column 12, Line 55 (Claim 2):
Delete the word "thereto-analytical" and replace it with "thermo-analytical".

Column 13, Line 1 (Claim 5):
Delete the word "thereto-analytical" and replace it with "thermo-analytical".

Signed and Sealed this
Twenty-eighth Day of February, 2023

Katherine Kelly Vidal
*Director of the United States Patent and Trademark Office*